(12) United States Patent
Hu et al.

(10) Patent No.: US 11,092,244 B1
(45) Date of Patent: Aug. 17, 2021

(54) SEALING DISC FOR VACUUM CLOSURE

(71) Applicants: Shanghai Advanced Research Institute, Chinese Academy of Science, Shanghai (CN); Shanghai Institute of Applied Physics, Chinese Academy of Science, Shanghai (CN); HIGHLIGHT TECH (SHANGHAI) CORP., Shanghai (CN)

(72) Inventors: Xiao Hu, Shanghai (CN); Ye-Liang Zhao, Shanghai (CN); Shao-Hui Zhang, Shanghai (CN); Chwung-Shan Kou, Shanghai (CN); Yen-Sheng Wang, Shanghai (CN); Chih-Hung Wang, Shanghai (CN); Chun-Shu Hsu, Shanghai (CN); Szu-Min Lin, Shanghai (CN); Ming-Sheng Tsai, Shanghai (CN); Wen-Wei Gu, Shanghai (CN)

( * ) Notice: Subject to any disclaimer, the term of this patent is extended or adjusted under 35 U.S.C. 154(b) by 0 days.

(21) Appl. No.: 17/117,140

(22) Filed: Dec. 10, 2020

(30) Foreign Application Priority Data

Oct. 23, 2020 (CN) .......................... 202011143486.6

(51) Int. Cl.
*F16K 1/36* (2006.01)
*F16K 51/02* (2006.01)
*F16K 1/42* (2006.01)

(52) U.S. Cl.
CPC .................. *F16K 1/36* (2013.01); *F16K 1/42* (2013.01); *F16K 51/02* (2013.01)

(58) Field of Classification Search
CPC ... F16K 51/02; F16K 1/36; F16K 1/34; F16K 1/42; F16K 3/18; F16K 3/10
See application file for complete search history.

(56) References Cited

U.S. PATENT DOCUMENTS

| | | | | |
|---|---|---|---|---|
| 877,865 | A * | 1/1908 | Ricksecker | F16K 1/34 251/334 |
| 1,800,127 | A * | 4/1931 | Wilson | F16K 1/34 251/334 |
| 1,847,385 | A * | 3/1932 | Dengler | F16K 1/34 251/86 |
| 2,196,798 | A * | 4/1940 | Horstmann | F16K 1/36 251/334 |
| 2,603,446 | A * | 7/1952 | Harding | F16K 1/36 251/334 |
| 2,893,685 | A * | 7/1959 | Van Camp | F16K 1/36 251/334 |
| 3,108,780 | A * | 10/1963 | Wishart | F16K 51/02 251/334 |

(Continued)

FOREIGN PATENT DOCUMENTS

| | | |
|---|---|---|
| DE | 2523152 A1 * | 11/1976 |
| DE | 2623906 A1 * | 12/1977 ............... F16K 1/34 |

*Primary Examiner* — David Colon-Morales (57) ABSTRACT

A sealing disc for vacuum closure suitable for using in reciprocating movement to an open position or a closed position to open or seal a valve port of an all-metal valve is disclosed. A sealing plate of the sealing disc is formed with a first sealing surface. When the sealing disc is in the closed position, the first sealing surface directly abuts against the valve port of the all-metal vacuum valve. A vacuum sealability can be improved and a service lifetime can be prolonged through compensating movement and adjusting movement between two metallic sealing surfaces abutting each other.

16 Claims, 5 Drawing Sheets

(56) References Cited

U.S. PATENT DOCUMENTS

| | | | |
|---|---|---|---|
| 3,547,399 A * | 12/1970 | Soderquist | F16K 51/02 251/86 |
| 3,554,486 A * | 1/1971 | Thebado | F16K 3/186 251/204 |
| 3,655,209 A * | 4/1972 | Polyakov | F16K 25/00 277/654 |
| 3,973,753 A * | 8/1976 | Wheeler | F16K 3/10 251/204 |
| 4,044,993 A * | 8/1977 | Wheeler | F16K 3/10 251/158 |
| 4,157,169 A * | 6/1979 | Norman | F16K 51/02 251/167 |
| 4,318,532 A * | 3/1982 | Winkler | F16K 51/02 251/333 |
| 4,395,049 A * | 7/1983 | Schertler | F16K 1/46 277/637 |
| 4,584,781 A * | 4/1986 | Parkinson | F16K 11/0856 137/625.23 |
| 4,627,599 A * | 12/1986 | Ehmig | F16K 1/425 251/333 |
| 5,318,274 A * | 6/1994 | Tinner | F16K 51/02 251/176 |
| 6,056,266 A * | 5/2000 | Blecha | F16K 3/0218 251/158 |
| 7,409,964 B2 * | 8/2008 | Hoeptner, III | F16K 1/04 137/218 |
| 8,590,861 B2 * | 11/2013 | Hiroki | F16K 51/02 251/158 |
| 9,528,614 B2 * | 12/2016 | Geiser | F16K 3/314 |
| 9,752,703 B2 * | 9/2017 | Kho | H01L 21/67126 |
| 2001/0040230 A1 * | 11/2001 | Yoo | F16K 51/02 251/326 |
| 2011/0169229 A1 * | 7/2011 | Hamade | F16K 3/0227 277/650 |
| 2015/0028243 A1 * | 1/2015 | Bernhart | F16K 3/02 251/318 |
| 2020/0173580 A1 * | 6/2020 | Sandeck | F16K 1/465 |

* cited by examiner

SEALING DISC FOR VACUUM CLOSURE

CROSS-REFERENCE TO RELATED APPLICATION

This application claims priority from Chinese Patent Application No. 202011143486.6, filed with the Chinese Patent Office on Oct. 23, 2020, the content of which are hereby incorporated by reference in their entirety for all purposes.

BACKGROUND OF THE INVENTION

1. Field of Invention

The invention relates to a sealing disc, and more particularly to a sealing disc for vacuum closure.

2. Description of the Related Art

Traditional vacuum valves mostly use rubber elastic materials for sealing element commonly known as O-ring between a valve plate and a valve. Since the O-ring achieves the required sealing effect through pressing and deformation, the O-ring is only suitable for using in valves that do not require high sealability. Therefore, such sealing element cannot be applied to high vacuum systems and cannot be applied in high temperature environments.

Some high vacuum systems adopt all-metal valve instead of rubber sealing element; however, they form a sealing surface by abutting between two metal layers. Therefore, the applied closing force needs to increase as the number of valve opening and closing times increase, and their service lives will be shortened. In addition, the dimensional change of the metal layers due to heating or cooling will cause relative movement between the two metal layers and cause shear deformation, thereby destroying the sealing surface.

SUMMARY OF THE INVENTION

In view of the above, an object of the invention is to provide a sealing disc for vacuum closure, which can be applied to an ultra-high vacuum system to solve the above-mentioned problems of the prior art.

In order to achieve the foregoing object, the invention discloses a sealing disc for vacuum closure suitable for using in reciprocating movement to an open position or a closed position to open or seal a metallic valve port of a vacuum valve, the sealing disc at least comprising: a base, the base having a first surface; and a sealing plate, the sealing plate connecting around the base, wherein the sealing disc simultaneously bears a closing force applied from an inside of the vacuum valve and an atmospheric pressure applied from an outside of the vacuum valve in the closed position, so that a first sealing surface of the sealing plate directly abuts against a second sealing surface in the valve port of the vacuum valve, and the first sealing surface is capable of simultaneously rotating relative to the second sealing surface with the applied closing force and the atmospheric pressure to maintain vacuum closure of the valve port.

Preferably, the sealing plate is a bent plate, a corrugated plate, or an arcuate plate.

Preferably, the sealing plate comprises: a first wing plate, the first wing plate is connected around the base at a first ring joint and extends outwardly in a direction away from the first ring joint at a first included angle relative to a ring surface of the first ring joint; and a second wing plate, the second wing plate is connected around the first wing plate at a second ring joint and extends outwardly in a direction away from the first surface of the base at a second included angle relative to the first wing plate, so that a third included angle is formed between the second wing plate and the ring surface of the first ring joint, wherein the first sealing surface is located on an end edge of the second wing plate.

Preferably, the closing force is directly applied to the second ring joint between the second wing plate and the first wing plate and the base at the same time.

Preferably, the closing force is directly applied to the base and indirectly applied to the sealing plate via the base.

Preferably, an angle value of the first included angle is between 5 degrees and 45 degrees, an angle value of the third included angle is between 5 degrees and 45 degrees, and a sum of an angle value of the first included angle, an angle value of the second included angle, and an angle value of the third included angle is 180 degrees.

Preferably, the base has a second surface opposite to the first surface, and the second surface is provided with a positioning member for positioning the sealing disc relative to a position of the valve port of the vacuum valve during a process of assembling the sealing disc with the vacuum valve.

Preferably, the first sealing surface of the sealing plate is an arc surface, a semi-spherical surface or a spherical surface.

Preferably, the first sealing surface of the sealing plate is a surface treated with lubrication and polishing.

Preferably, the sealing plate is made of metal, and the vacuum valve is an all-metal valve.

Preferably, the sealing plate is made of metal, and the vacuum valve is an all-metal high-frequency shielded gate valve.

Preferably, the sealing plate is integrally connected around the base.

Preferably, the sealing plate is detachably connected around the base.

In order to achieve the foregoing object, the invention further discloses a sealing disc suitable for using in reciprocating movement to an open position or a closed position to open or seal a valve port of a valve, characterized in that: an outer edge of a sealing plate of the sealing disc has a first sealing surface, in the closed position the sealing disc abuts against a second sealing surface in the valve port of the valve with the first sealing surface, and the first sealing surface of the sealing plate is capable of rotatably abutting against the second sealing surface with an applied force to seal the valve port, wherein the sealing plate is a bent plate, a corrugated plate, or an arcuate plate.

Preferably, the sealing plate comprises: a first wing plate, the first wing plate is connected around a base at a first ring joint and extends outwardly in a direction away from the first ring joint at a first included angle relative to a ring surface of the first ring joint; and a second wing plate, the second wing plate is connected around the first wing plate at a second ring joint and extends outwardly in a direction away from a first surface of the base at a second included angle relative to the first wing plate, so that a third included angle is formed between the second wing plate and the ring surface of the first ring joint, wherein the first sealing surface is located on an end edge of the second wing plate.

Preferably, the base is connected to a carrier, and a closing force is applied to the second ring joint connecting between the second wing plate and the first wing plate and/or the base via the carrier.

Preferably, an angle value of the first included angle is between 5 degrees and 45 degrees, an angle value of the third included angle is between 5 degrees and 45 degrees, and a sum of an angle value of the first included angle, an angle value of the second included angle, and an angle value of the third included angle is 180 degrees.

Preferably, the first sealing surface of the sealing plate is a surface treated with lubrication and polishing.

Preferably, the sealing plate is made of metal, and the valve is a vacuum valve.

Preferably, the valve is an all-metal vacuum valve.

In summary, the sealing disc for vacuum closure of the invention has the following advantages:

(1) The sealing disc is capable of directly abutting against the valve port of the vacuum valve via the first sealing surface of the sealing plate to achieve a vacuum closure effect, even an ultra-high vacuum closure effect, without the need for additional gaskets or spacers.

(2) The sealing disc will not outgas under ultra-high vacuum environment, so the sealing disc can be applied to valves with high specification requirements, such as all-metal high-frequency shielded gate valve.

(3) Even in an ultra-high vacuum environment, the sealing disc can still withstand the closing force applied to the sealing disc from the inside of the vacuum valve and the atmospheric pressure applied to the sealing disc from the outside of the vacuum valve, and can also constantly maintain a vacuum sealability.

(4) The first sealing surface of the sealing disc is capable of rotating relative to the second sealing surface, and constantly keeping in contact with each other, thereby providing lubrication effect when the metallic sealing surfaces abut each other, and also providing compensating movement and adjusting movement, and therefore capable of improving a vacuum sealability and prolonging a service lifetime.

In order to enable the examiner to have a further understanding and recognition of the technical features of the invention and the technical efficacies that can be achieved, preferred embodiments in conjunction with detailed explanation are provided as follows.

DETAILED DESCRIPTION OF THE PREFERRED EMBODIMENTS

In order to understand the technical features, content and advantages of the invention and its achievable efficacies, the invention is described below in detail in conjunction with the figures, and in the form of embodiments, the figures used herein are only for a purpose of schematically supplementing the specification, and may not be true proportions and precise configurations after implementation of the invention; and therefore, relationship between the proportions and configurations of the attached figures should not be interpreted to limit the scope of the claims of the invention in actual implementation. In addition, in order to facilitate understanding, the same elements in the following embodiments are indicated by the same referenced numbers.

A sealing disc for vacuum closure of the invention is suitable for using in reciprocating movement to an open position or a closed position to open or seal a valve port of a vacuum valve. The vacuum valve applicable to the invention is an all-metal valve, such as an all-metal high-frequency shielded gate valve, and a vacuum degree thereof can reach ultra-high vacuum grade, which is used to illustrate the high sealability and structural strength of the sealing disc of the invention. However, the vacuum valve applicable to the invention is not limited to gate valve, but can also be angle valve, pendulum valve, or various types of valves. The aforementioned vacuum valve can be, for example, a metallic valve, that is, a valve made of metal material, and preferably an all-metal valve, wherein the valve port is preferably made of metal material. The sealing disc of the invention can also be applied to valves of various materials according to actual usage, so it is not limited to metal valves. The sealing disc of the invention can be, for example, a single-sided sealing type or a double-sided sealing type. Take the single-sided sealing type as an example, which includes a sealing plate and a base integrally connected with each other. The sealing disc of the invention can also be a double-sided sealing type, which is composed of a sealing plate.

In detail, as shown in FIGS. 1 to 5, a preferred embodiment of the invention takes a sealing disc of a single-sided sealing type as an example. A sealing disc 10 of the invention is suitable for opening or sealing a valve port 102 of a vacuum valve 100. The vacuum valve 100 can be, for example, but not limited to, an all-metal high-frequency shielded gate valve. The sealing disc 10 of the invention includes a base 20 and a sealing plate 30 that are integrally connected. Materials of the base 20 and the sealing plate 30 are, for example, but not limited to, metal materials such as stainless steel or spring steel. A first surface 22 of a first side of the base 20 of the sealing disc 10 is used to connect with a carrier 110, the carrier 110 is, for example, an arm or a bracket connected to a driving element (not shown in the figures) of the vacuum valve 100, so as to reciprocatively move the sealing disc 10 to an open position or a closed position to open or seal the valve port 102 of the vacuum valve 100; however, the invention is not limited thereto. For example, the invention can omit the carrier 110, that is, the sealing disc 10 can be selectively directly connected to the driving element of the vacuum valve 100. In addition, the carrier 110 can also be, for example, a component of the driving element of the vacuum valve 100. An outer shape of the base 20 is, for example, but not limited to, a cylinder. A type of the carrier 110 can be, for example, but not limited to, a connecting member such as a carrier plate, a shaft or a connecting rod that can be connected to the sealing disc 10. The carrier 110 can be connected to a first surface 22 of the base 20 of the sealing disc 10 by means of screw connection, so the first surface 22 of the base 20 can have, for example, but not be limited to, one screw hole 21 or a plurality of screw holes 21. A depth of the screw hole 21 preferably does not penetrate the base 20. In addition, a surface of the carrier 110 can be penetrated with a corresponding number of screw holes (not shown in the figures). Taking the carrier 110 as a carrier plate as an example, the carrier 110 preferably has an accommodating groove 114 for accommodating the first side of the base 20. A surface of the accommodating groove 114 of the carrier 110 preferably contacts the first surface 22 of the base 20.

In addition, a second side of the base 20 of the sealing disc 10 has a second surface 24 opposite to the first surface 22. The second surface 24 of the base 20 can optionally have a positioning member 26, such as but not limited to a positioning groove. If the second surface 24 of the base 20 of the sealing disc 10 has the positioning member 26, a tool such as a jig to position the sealing disc 10 relative to a position of the valve port 102 of the vacuum valve 100 can be, for example, inserted into the positioning member 26 during a process of assembling the sealing disc 10 with the vacuum valve 100. For example, a central axis of the positioning member 26 is preferably the same as a central axis of the base 20 and the sealing disc 10. When the sealing disc 10 seals the valve port 102 of the vacuum valve 100, the central axis of the sealing disc 10 is, for example, coaxially aligned with a central axis of the valve port 102.

In one preferred embodiment of the invention, the sealing plate 30 of the sealing disc 10 is integrally connected around a side edge of the first side or a side edge of the second side of the base 20, and the sealing plate 30 is preferably integrally connected around the side edge of the second side of the base 20. The sealing plate 30 has a first sealing surface 32, and the first sealing surface 32 can be located at any position of the sealing plate 30, wherein the first sealing surface 32 is preferably located at an outer edge of the sealing plate 30. The valve port 102 has a second sealing surface 104 preferably located at an inner side of the valve port 102. In terms of appearance, a cross-sectional shape of the sealing plate 30 of the sealing disc 10 can be, for example, a bent plate, a corrugated plate, or an arcuate plate, capable of enhancing structural strength and rigidity, and also enhancing structural toughness, so that the sealing disc 10 becomes a toughened structure that simultaneously retains strength and rigidity, but the invention is not limited thereto, and the cross-sectional shape of the sealing plate 30 can also be, for example, a flat plate. When the sealing disc 10 of the invention is applied to vacuum closure, the sealing disc 10 of the invention can not only withstand a closing force F applied to the sealing disc 10 from an inside of the vacuum valve 100, but also withstand an atmospheric pressure applied to the sealing disc 10 from an outside of the vacuum valve 100 when the vacuum valve 100 is in a vacuum state. The higher a vacuum degree of the vacuum valve 100, the higher the aforementioned closing force F and the atmospheric pressure. For example, if the sealing disc 10 is made of stainless steel with a thickness of about 1.8 mm, the closing force F that can be withstood can reach about 500 Kg, and when the vacuum valve 100 is vacuumed, a vacuum degree can reach about $7.33 \times 10^{-11}$ torr. Since the invention can be applied to an all-metal high-frequency shielded gate valve installed in an electron beam channel of a superconducting accelerator, it is obviously that various functions and indicators of the sealing disc 10 of the invention, such as airtightness, cleanliness and structural strength surely meet the specification requirements of ultra-high vacuum valve.

Figure 1:
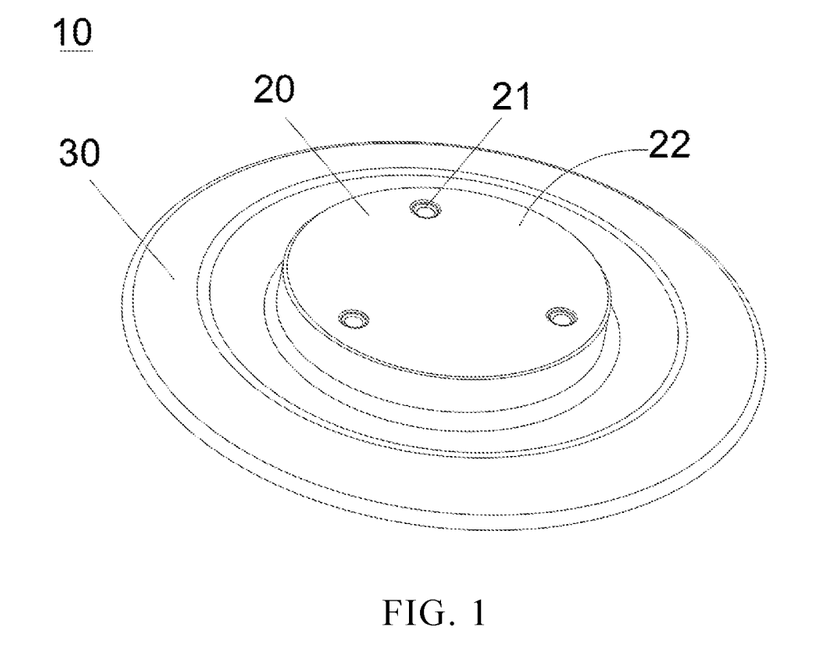
FIG. 1 is a top perspective view of a sealing disc of a preferred embodiment of invention.
Figure 2:
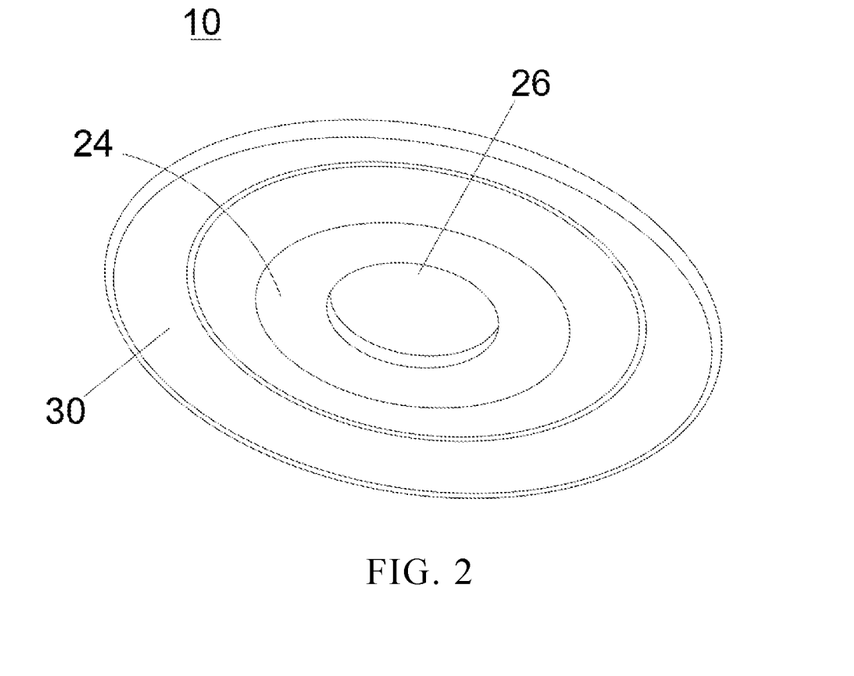
FIG. 2 is a bottom perspective view of the sealing disc of a preferred embodiment of invention.
Figure 3:
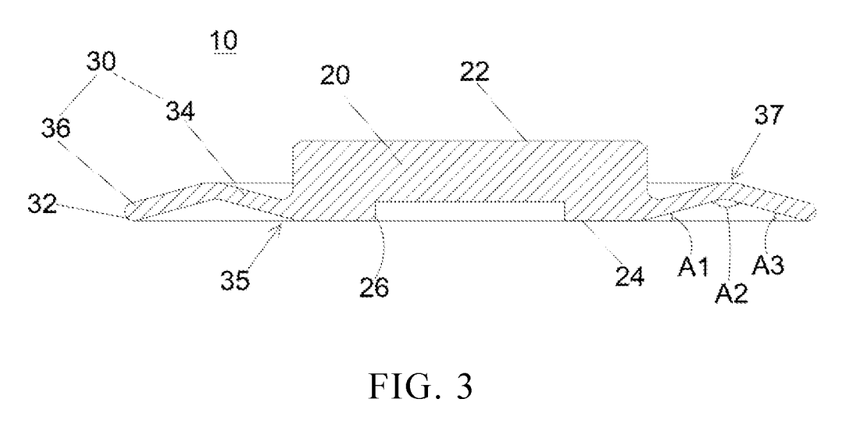
FIG. 3 is a cross-sectional view of the sealing disc of a preferred embodiment of invention.

The sealing plate 30 of the sealing disc 10 of the invention includes, for example, a first wing plate 34 and a second wing plate 36 that are integrally connected. The first wing plate 34 and/or the second wing plate 36 can be, for example, but not limited to, a flat plate, an arcuate plate or a bent plate. Taking the flat plate as shown in the figures as an example, an inclination direction of the first wing plate 34 is different from that of the second wing plate 36. The first wing plate 34 is annularly connected around the base 20 at a first ring joint 35 and extends outwardly in a direction away from the first ring joint 35 at a first included angle A1 relative to a ring surface of the first ring joint 35. The second wing plate 36 is annularly connected around the first wing plate 34 at a second ring joint 37 and extends outwardly in a direction away from the first surface 22 of the base 20 at a second included angle A2 relative to the first wing plate 34, so that a third included angle A3 is formed between the second wing plate 36 and the ring surface of the first ring joint 35, wherein the first sealing surface 32 is located on an end edge of the second wing plate 36.

Figure 4:
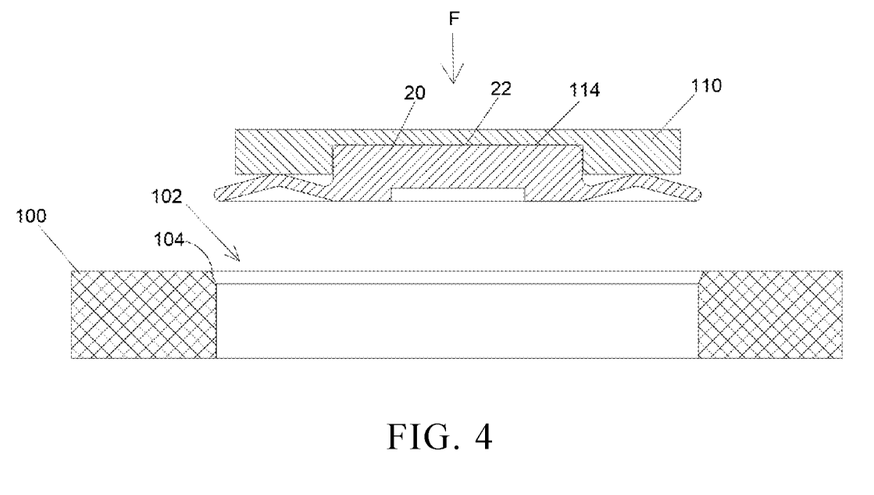
FIG. 4 is a cross-sectional view of the sealing disc in an open position of a preferred embodiment of invention.
Figure 5:
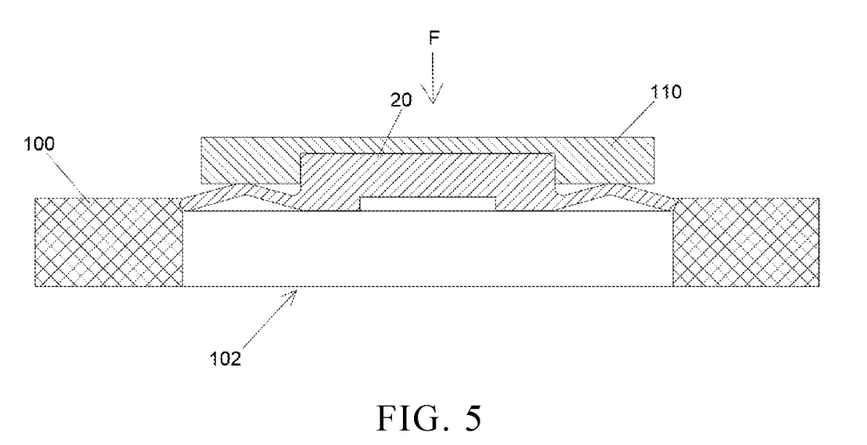
FIG. 5 is cross-sectional view of the sealing disc in a closed position of a preferred embodiment of invention.

When the carrier 110 is connected to the first surface 22 of the base 20 of the sealing disc 10 and the closing force F is applied to the carrier 110, the closing force F can be applied to the first surface 22 of the base 20 and/or the sealing plate 30 via the carrier 110, for example, so that the first sealing surface 32 of the sealing plate 30 abuts against the second sealing surface 104 in the valve port 102 of the vacuum valve 100 when the sealing disc 10 is in the closed position. Wherein the first sealing surface 32 is, for example, in line contact with the second sealing surface 104. A surface form of the first sealing surface 32 is, for example, but not limited to, an arc surface, a semi-spherical surface or a spherical surface. The second sealing surface 104 can be, for example, but not limited to, an inclined surface, an arc surface, a semi-spherical surface or a spherical surface. When the sealing disc 10 enters the closed position from the open position, the first sealing surface 32 is capable of contacting the second sealing surface 104, and even if the closing force F applied from the inside of the vacuum valve 100 causes the sealing disc 10 to slightly elastically deform, the first sealing surface 32 is capable of abutting against the second sealing surface 104 in a rotating manner (in a direction toward or away from the valve port 102).

In addition, in the closed position, when a vacuum degree of the vacuum valve 100 becomes higher and higher as air is drawn out, the closing force F applied from the inside of the vacuum valve 100 will push the sealing disc 10 to the outside of the vacuum valve 100, and the atmospheric pressure applied from the outside of the vacuum valve 100 will also push the sealing disc 10 toward the inside of the vacuum valve 100. Even if the sealing plate 30 is slightly elastically deformed, the first sealing surface 32 is capable of rotatably abutting the second sealing surface 104 with the applied closing force F and atmospheric pressure. In other words, when the first sealing surface 32 of the sealing plate 30 directly abuts the second sealing surface 104 in the valve port 102 of the vacuum valve 100, the arc or spherical first sealing surface 32 can be allowed to rotate relative to the second sealing surface 104, and the first sealing surface 32 keeps abutting against the second sealing surface 104, thereby constantly maintaining a vacuum sealability. Therefore, compensating movement and adjusting movement of the metallic sealing surfaces abutting against each other are capable of improving a vacuum sealability and prolonging a service lifetime, and avoiding abrasion caused by collision between metals.

Wherein an angle value of the first included angle A1 is, for example, between 5 degrees and 45 degrees, preferably between 10 degrees and 25 degrees, more preferably 15 degrees; an angle value of the third included angle A3 is, for example, between 5 degrees and 45 degrees, preferably between 10 degrees and 25 degrees, more preferably 15 degrees; a sum of an angle value of the first included angle A1, an angle value of the second included angle A2, and an angle value of the third included angle A3 is 180 degrees. Therefore, when the sealing disc 10 of the invention is applied to vacuum closure, the sealing plate 30 of the invention can not only withstand the closing force F applied to the carrier 110 from the inside of the vacuum valve 100, but can also withstand the atmospheric pressure applied to the outside of the vacuum valve 100 after the vacuum valve 100 is vacuumed, and can also constantly maintain a vacuum sealability. In addition, taking the sealing plate 30 in a form of a bent plate as an example, the sealing plate 30 of the sealing disc 10 of the invention is not limited to including the first wing plate 34 and the second wing plate 36 that are integrally connected; the sealing plate 30 can also, for example, further include the other first wing plate 34 connected to the second wing plate 36; and for example, further include the other second wing plate 36 connected to the above-mentioned other first wing plate 34, and so on.

As shown in the figures, when the carrier 110 is connected to the sealing disc 10, the carrier 110 can be connected to the base 20. The carrier 110 preferably abuts against the sealing plate 30, and preferably abuts against the second wing plate 36, the second ring joint 37 of the first wing plate 34 and the base 20, thereby when the closing force F is applied to the carrier 110, the closing force F can be directly applied to the sealing plate 30 and the base 20 via the carrier 110 at the same time, so that the first sealing surface 32 of the sealing disc 10 directly abuts against the second sealing surface 104 of the valve port 102 of the vacuum valve 100 in the closed position. In addition, if the carrier 110 is not abutting the sealing plate 30, the closing force F can be applied to the sealing plate 30 indirectly, for example, via the base 20. A thickness of the first wing plate 34 is, for example, but not limited to, the same as a thickness of the second wing plate 36. A projection length of the first wing plate 34 is, for example, but not limited to, the same as a projection length of the second wing plate 36. The projection length of the first wing plate 34 is approximately 0.8 to 1.5 times the projection length of the second wing plate 36. A projection length of the base 20 is approximately 2 to 5 times the projection length of the first wing plate 34. However, the above values are merely examples, and are not intended to limit the invention.

The first sealing surface 32 of the sealing plate 30 of the sealing disc 10 of the invention can be selectively subjected to mechanical processing procedures such as lubrication and polishing, preferably adopting dry polishing technology, such as dry blasting technology or fluid-jet polishing technology; by spraying abrasive particles to reduce surface roughness and increase lubricity, so that a surface roughness (Ra) is preferably less than about 0.3 μm, and more preferably less than about 0.1 μm. Wherein the invention is not limited to a type of specific polishing technology and a material of the abrasive particles, as long as the first sealing surface 32 has surface roughness and lubricity capable of vacuum sealing the valve port 102, the first sealing surface 32 can be applied to the invention.

In another preferred embodiment of the invention, the sealing disc 10 can also be a double-sided sealing type, for example. Compared with the single-sided sealing type sealing disc 10 of the above-mentioned preferred embodiment, differences between the other preferred embodiment and the above-mentioned preferred embodiment only lie in the double-sided sealing type sealing plate 30 having the first sealing surface 32 and a third sealing surface (not shown in the figures) at two sides respectively, wherein the first sealing surface 32 is used to rotatably seal the valve port 102 of the vacuum valve 100, and the third sealing surface is used to, for example, rotatably or non-rotatably abut a fourth sealing surface (not shown in the figures) of the base 20. That is, the double-sided sealing type sealing plate 30 of the other preferred embodiment is not integrally connected to the base 20. Wherein a material and a form of the third sealing surface are, for example, the same as those of the first sealing surface 32.

In summary, the sealing disc for vacuum closure of the invention has the following advantages:

(1) The sealing disc is capable of directly abutting against the valve port of the vacuum valve via the first sealing surface of the sealing plate to achieve a vacuum closure effect, even an ultra-high vacuum closure effect, without the need for additional gaskets or spacers.

(2) The sealing disc will not outgas under ultra-high vacuum environment, so the sealing disc can be applied to valves with high specification requirements, such as all-metal high-frequency shielded gate valve.

(3) Even in an ultra-high vacuum environment, the sealing disc can still withstand the closing force applied to the sealing disc from the inside of the vacuum valve and the atmospheric pressure applied to the sealing disc from the outside of the vacuum valve, and can also constantly maintain a vacuum sealability.

(4) The first sealing surface of the sealing disc is capable of rotating relative to the second sealing surface, and constantly keeping in contact with each other, thereby providing lubrication effect when the metallic sealing surfaces abut each other, and also providing compensating movement and adjusting movement, and therefore capable of improving a vacuum sealability and prolonging a service lifetime.

In summary, the invention has indeed achieved the intended object and efficacies of use, and is more ideal and practical than the prior art. However, the above-mentioned embodiment is merely specific descriptions of the preferred embodiment of the invention, this embodiment is not intended to limit the claims of the invention, and all other equivalent changes and modifications completed without departing from the technical means disclosed in the invention should be included in the claims covered by the invention.

What is claimed is:

1. A sealing disc for vacuum closure suitable for using in reciprocating movement to an open position or a closed position to open or seal a metallic valve port of a vacuum valve, the sealing disc at least comprising:

a base, the base having a first surface; and a sealing plate, the sealing plate connecting around the base, wherein the sealing disc simultaneously bears a closing force applied from an inside of the vacuum valve and an atmospheric pressure applied from an outside of the vacuum valve in the closed position, so that a first sealing surface of the sealing plate is capable of rotatably abutting against a second sealing surface in the valve port of the vacuum valve with the closing force and the atmospheric pressure to maintain vacuum closure of the valve port, wherein the sealing plate comprises:

a first wing plate, the first wing plate is connected around the base at a first ring joint and extends outwardly in a direction away from the first ring joint at a first included angle relative to a ring surface of the first ring joint; and a second wing plate, the second wing plate is connected around the first wing plate at a second ring joint and extends outwardly in a direction away from the first surface of the base at a second included angle relative to the first wing plate, so that a third included angle is formed between the second wing plate and the ring surface of the first ring joint, wherein the first sealing surface is located on an end edge of the second wing plate.

2. The sealing disc for vacuum closure as claimed in claim 1, wherein the sealing plate is a bent plate, a corrugated plate, or an arcuate plate.

3. The sealing disc for vacuum closure as claimed in claim 1, wherein the closing force is directly applied to the second ring joint between the second wing plate and the first wing plate and the base at the same time.

4. The sealing disc for vacuum closure as claimed in claim 1, wherein the closing force is directly applied to the base and indirectly applied to the sealing plate via the base.

5. The sealing disc for vacuum closure as claimed in claim 1, wherein an angle value of the first included angle is between 5 degrees and 45 degrees, an angle value of the third included angle is between 5 degrees and 45 degrees, and a sum of the angle value of the first included angle, an angle value of the second included angle, and the angle value of the third included angle is 180 degrees.

6. The sealing disc for vacuum closure as claimed in claim 1, wherein the base has a second surface opposite to the first surface, and the second surface is provided with a positioning member for positioning the sealing disc relative to a position of the valve port of the vacuum valve during a process of assembling the sealing disc with the vacuum valve.

7. The sealing disc for vacuum closure as claimed in claim 1, wherein the first sealing surface of the sealing plate is an arc surface, a semi-spherical surface or a spherical surface.

8. The sealing disc for vacuum closure as claimed in claim 1, wherein the first sealing surface of the sealing plate is a surface treated with lubrication and polishing.

9. The sealing disc for vacuum closure as claimed in claim 1, wherein the sealing plate is made of metal, and the vacuum valve is an all-metal valve.

10. The sealing disc for vacuum closure as claimed in claim 1, wherein the sealing plate is integrally connected around the base.

11. A sealing disc suitable for using in reciprocating movement to an open position or a closed position to open or seal a valve port of a valve, characterized in that: an outer edge of a sealing plate of the sealing disc has a first sealing surface, in the closed position the sealing disc abuts against a second sealing surface in the valve port of the valve with the first sealing surface, and the first sealing surface of the sealing plate is capable of rotatably abutting against the second sealing surface with an applied force to seal the valve port, wherein the sealing plate is a bent plate, a corrugated plate, or an arcuate plate, wherein the sealing plate comprises:
a first wing plate, the first wing plate is connected around a base at a first ring joint and extends outwardly in a direction away from the first ring joint at a first included angle relative to a ring surface of the first ring joint; and
a second wing plate, the second wing plate is connected around the first wing plate at a second ring joint and extends outwardly in a direction away from a first surface of the base at a second included angle relative to the first wing plate, so that a third included angle is formed between the second wing plate and the ring surface of the first ring joint, wherein the first sealing surface is located on an end edge of the second wing plate.

12. The sealing disc as claimed in claim 11, wherein the base is connected to a carrier, and a closing force is applied to the second ring joint connecting between the second wing plate and the first wing plate and/or the base via the carrier.

13. The sealing disc as claimed in claim 11, wherein an angle value of the first included angle is between 5 degrees and 45 degrees, an angle value of the third included angle is between 5 degrees and 45 degrees, and the sum of an angle value of the first included angle, an angle value of the second included angle, and the angle value of the third included angle is 180 degrees.

14. The sealing disc as claimed in claim 11, wherein the first sealing surface of the sealing plate is a surface treated with lubrication and polishing.

15. The sealing disc as claimed in claim 11, wherein the sealing plate is made of metal, and the valve is a vacuum valve.

16. The sealing disc as claimed in claim 15, wherein the valve is an all-metal vacuum valve.

* * * * *